US012401640B2

(12) United States Patent
Carlson et al.

(10) Patent No.: US 12,401,640 B2
(45) Date of Patent: Aug. 26, 2025

(54) SECURE USE OF AUTHORITATIVE DATA WITHIN BIOMETRY BASED DIGITAL IDENTITY AUTHENTICATION AND VERIFICATION

(71) Applicant: Governor's Office of Information Technology, Denver, CO (US)

(72) Inventors: Casey Carlson, Denver, CO (US); Olga Klinger, Highlands Ranch, CO (US); Michael Dixon, Lakewood, CO (US); David McCurdy, Centennial, CO (US)

( * ) Notice: Subject to any disclaimer, the term of this patent is extended or adjusted under 35 U.S.C. 154(b) by 179 days.

(21) Appl. No.: 16/949,504

(22) Filed: Oct. 30, 2020

(65) Prior Publication Data

US 2021/0136064 A1 May 6, 2021

Related U.S. Application Data

(60) Provisional application No. 62/927,820, filed on Oct. 30, 2019.

(51) Int. Cl.
*H04L 29/00* (2006.01)
*H04L 9/40* (2022.01)
(52) U.S. Cl.
CPC .......... *H04L 63/0861* (2013.01); *H04L 63/20* (2013.01)
(58) Field of Classification Search
CPC ............................ H04L 63/0861; H04L 63/20
See application file for complete search history.

(56) References Cited

U.S. PATENT DOCUMENTS

| 10,878,274 | B2* | 12/2020 | Mattes | G06V 10/40 |
| 11,341,508 | B2* | 5/2022 | Mercury | H04L 63/0861 |
| 2009/0031140 | A1* | 1/2009 | Abdallah | H04L 9/3247 |
| | | | | 713/186 |
| 2009/0119756 | A1* | 5/2009 | Acuna | G06Q 20/40 |
| | | | | 726/5 |
| 2018/0330459 | A1* | 11/2018 | Elder | G06Q 20/3674 |

OTHER PUBLICATIONS

NPL: Grassi, Paul A. et al., "Digital Identity Guidelines: Authentication and Lifecycle Management," National Institute of Standards and Technology (Jun. 22, 2017). (Year: 2017).*

(Continued)

*Primary Examiner* — Jeffrey C Pwu
*Assistant Examiner* — Helai Salehi
(74) *Attorney, Agent, or Firm* — Josh C. Snider

(57) ABSTRACT

Personal and biometric information is obtained from an individual using a remote device and submitted to an application server. The application server transmits the personal or biometric information to an authenticated data repository that identifies the individual. The application server also submits the biometric information from the individual and biometric information from the authenticated data repository to a biometric comparison service for analysis. If the individual's submitted personal and biometric information matches the information in the authoritative data repository, the individual is issued a digital identification credential. An individual's digital identification credential can be authenticated at the time it is being used, and the user's identity can be verified in real-time if requested.

19 Claims, 3 Drawing Sheets

(56) References Cited

OTHER PUBLICATIONS

Grassi et al., Digital Identity Guidelines, NIST Special Publication 800-63-3, Jun. 2017 (Updated as of Mar. 2, 2020), U.S. Department of Commerce, United States of America, https://doi.org/10.6028/NIST.SP.800-63-3, 75 pages.

Grassi et al., Digital Identity Guidelines—Enrollment and Identity Proofing, NIST Special Publication 800-63A, Jun. 2017 (Updated as of Mar. 2, 2020), U.S. Department of Commerce, United States of America, https://doi.org/10.6028/NIST.SP.800-63a, 47 pages.

Grassi et al., Digital Identity Guidelines—Authentication and Lifecycle Management, NIST Special Publication 800-63B, Jun. 2017 (Updated as of Mar. 2, 2020), U.S. Department of Commerce, United States of America, https://doi.org/10.6028/NIST.SP.800-63b, 79 pages.

Grassi et al., Digital Identity Guidelines—Federation and Assertions, NIST Special Publication 800-63C, Jun. 2017 (Updated as of Mar. 2, 2020), U.S. Department of Commerce, United States of America, https://doi.org/10.6028/NIST.SP.800-63c, 49 pages.

Information Technology Laboratory, NIST, Measuring Strength of Identity Proofing, Workshop: Applying Measurement Science to the Identity Ecosystem, Discussion Draft Version: 1, Dec. 16, 2015, U.S. Department of Commerce, United States of America, https://www.nist.gov/system/files/nstic-strength-identity-proofing-discussion-draft.pdf, 12 pages.

Megas et al., NSTIC Pilots: Catalyzing the Identity Ecosystem, NISTIR 8054, Apr. 2015 (Includes updates as of Sep. 20, 2015), U.S. Department of Commerce, United States of America, http://nvlpubs.nist.gov/nistpubs/ir/2015/NIST.R.8054.pdf, 74 pages.

The White House, National Strategy for Trusted Identities in Cyberspace, Apr. 2011, United States of America, https://obamawhitehouse.archives.gov/sites/default/files/rss_viewer/NSTICstrategy_041511.pdf, 52 pages.

U.S. Congress, Real ID Act—Title II, H.R. 1268, Emergency Supplemental Appropriations Act for Defense, the Global War on Terror, and Tsunami Relief, 2005 (Enrolled as Agreed to or Passed by Both House and Senate), U.S. Department of Homeland Security, United States of America, https://www.dhs.gov/secure-drivers-license-documentation, 6 pages.

Colorado Legislature, Title 42 Vehicles and Traffic, Articles 1-3, Colorado Revised Statutes 2017, State of Colorado, United States of America, https://leg.colorado.gov/sites/default/files/images/olls/crs2017-title-42.pdf, 290 pages.

American Association of Motor Vehicle Administrators, 2016 AAMVA DL/ID Card Design Standard Personal Identification—AAMVA North American Standard, Sep. 2016, United States of America, https://www.aamva.org/2016CardDesignStandard/, 126 pages.

American Association of Motor Vehicle Administrators, AAMVA DL/ID Card Design Standard Personal Identification—AAMVA North American Standard, Aug. 2013, United States of America, https://www.aamva.org/2013DLIDCardDesignStandard/, 130 pages.

American Association of Motor Vehicle Administrators, Mobile Driver's License Functional Needs White Paper 0.9 Document Version, 2019, United States of America, https://www.aamva.org/FunctionalNeedsWhitepaper-9/, 28 pages.

American Association of Motor Vehicle Administrators, Model Legislation for Mobile Driver License (mDL), Aug. 2018, United States of America, https://www.aamva.org/AAMVA_mDL_Model_Legislation_AUG2/, 6 pages.

American Association of Motor Vehicle Administrators, Procurement Guidance for Mobile Driver License (mDL), Aug. 2018, United States of America, https://www.aamva.org/AAMVA_mDL_Procurement_Guidance_AUG/, 10 pages.

American Association of Motor Vehicle Administrators, PMobile Driver License (mDL) Implementation Guidelines, Apr. 2019, United States of America, https://www.aamva.org/mDLImplementationGuidelines-April2019/, 123 pages.

Slagle, Digital Driver's Licenses, 2015 AAMVA Region II Conference, Nov. 4, 2015, American Association of Motor Vehicle Administrators, United States of America, https://www.aamva.org/mDLDrivenByFunctionality_gSlagle_112015/, 20 pages.

Slagle, eID Conference, Sep. 28, 2015, American Association of Motor Vehicle Administrators, United States of America, https://www.aamva.org/mDLOverviewPresentation_gSagle_092015/, 18 pages.

Lowe, Digital Driver's Licenses, 2015 AAMVA Region II Conference, Jun. 21-24, 2015, American Association of Motor Vehicle Administrators, United States of America, https://www.aamva.org/DigitalDriversLicense_LoweDiFraia_June2015/, 26 pages.

ISO/IEC, Personal identification—ISO-compliant driving licence—Part 5: Mobile driving licence (mDL) application, Feb. 5, 2020, ISO Copyright Office, Switzerland, https://www.iso.org/standard/69084.html, 126 pages.

* cited by examiner

SECURE USE OF AUTHORITATIVE DATA WITHIN BIOMETRY BASED DIGITAL IDENTITY AUTHENTICATION AND VERIFICATION

RELATED APPLICATION

This application claims priority to U.S. provisional patent application No. 62/927,820, entitled "OAuth Token Extension for Incorporation of Authoritative Data to Biometry Based Identity Verification," filed Oct. 30, 2019, the contents of which are hereby incorporated by reference.

FIELD OF THE INVENTION

The present invention is directed to the validation, authentication, and verification of individuals' identities. Specifically, the invention provides a secure and accurate system and method for issuing to an individual a valid and authenticated digital identification credential that may be used for numerous purposes including the purpose of personal identification. The valid and authenticated digital identification credential may be used to verify the identity of an individual to a relying party, where a relying party is any entity that needs to accurately determine an individual's identity.

BACKGROUND OF THE INVENTION

Governmental and other entities throughout the world provide identification credentials designed to allow individuals to validly and authentically identify themselves. Such credentials exist in many different forms and have historically been tangible items imprinted with identifying information. Such entities are referred to herein as credential issuing entities. A credential issuing entity may be required to comply with certain standards prescribed by a governmental entity related to identity validation, authentication, and verification.

In existing systems utilizing tangible identification credentials, credential issuing entities have interactions with individuals that allow the entities to verify the identities of those individuals. Such interactions typically involve a credential issuing entity receiving and making a copy of one more pieces of tangible identifying information from an individual, such as passports, birth certificates and social security cards, collecting and recording personal information, such as name, address, email address, telephone number, date of birth, social security number, and physical characteristics, and creating and recording biometric information, such as photographs, fingerprints, and retinal scans.

After a credential issuing entity verifies the identity of an individual, the credential issuing entity issues an identification credential to the individual. Identification credentials issued to individuals exist in various forms, but are typically tangible, such as driver's licenses and passports. Tangible identification credentials display some, but not necessarily all, of the personal and biometric information collected by the credential issuing entity about the individual. The personal information collected from an individual whose identity has been verified by a credential issuing entity is referred to herein as "authoritative personal information." The biometric information collected from an individual whose identity has been authenticated by a credential issuing entity is referred to herein as "authoritative biometric information." "Authoritative personal information" and "authoritative biometric information" for an individual are collectively referred to herein as "authoritative identifying information."

For an individual whose identity has been verified by a credential issuing entity, a data record is created, by or on behalf of the credential issuing entity, that comprises authoritative identifying information for the authenticated individual. Such data records are stored by or on behalf of the credential issuing entity in an "authoritative data repository," 125 which may be a database, server, computer, other device, or other location in which data records comprising authoritative identifying information about individuals is stored.

Authoritative identifying information may be comprised of information collected or stored by or on behalf of a governmental entity, and an authoritative data repository 125 may be a repository comprised of data records comprised of authoritative identifying information collected or stored by or on behalf of a governmental entity.

Individuals use identification credentials to verify their identities to relying parties. A relying party relies on an identification credential presented by an individual to determine whether the individual is actually the person that the individual claims to be.

Authenticity is a critical characteristic of identification credentials. Recognizing the importance of authenticity, credential issuing entities typically include security elements on tangible identification credentials. Security elements are designed to allow relying parties to determine the authenticity of tangible identification credentials so that tangible identification credentials can be used as trusted and reliable means of identifying individuals.

However, despite the presence of security elements, tangible identification credentials can be—and frequently ar— fraudulently manufactured and presented to relying parties. The use of fraudulent tangible identification credentials frequently results in identity theft, which can cause massive losses for both relying parties and individuals whose identities are contained on fraudulent tangible identification credentials.

Relying parties frequently retain replicated copies of tangible identification credentials from individuals. Those copies may contain more personally identifiable information than a relying party needs, which has privacy implications for the individual whose credentials are copied and retained.

Accuracy is another critical characteristic of identity verification. Existing tangible information credentials often contain outdated or inaccurate information, such as previous residences or mailing addresses, even after such information has been updated in the credential issuing entity's authoritative data repository. Relying parties may also need to manually enter the information contained on tangible credentials into the relying parties' own computer systems. When information must be manually entered into the relying parties' systems, there is an inherent risk that the information contained in the relying parties' system was entered inaccurately and does not match the information contained on the tangible identification credentials.

Existing digital identification credentials are not substitutes for tangible identification credentials because existing digital identification credentials lack sufficient identity verification and authentication necessary for the existing digital identification credential to be relied on by relying parties as a trusted and reliable means of identifying individuals.

SUMMARY OF THE INVENTION

The inventors have developed the present invention which overcomes the drawbacks of existing tangible and digital identification credentials and provides a method and a system for dramatically improving the trustworthiness and accuracy of identity authentication and verification systems. This increases the likelihood that transactions requiring identity authentication will be conducted more accurately and securely, and decreases the risk of fraud in the identity authentication process.

The present invention improves upon current methods of identity verification and authentication by providing systems and methods for entities to issue digital identification credentials to individuals that have been verified and authenticated by comparing authoritative identifying information with personal and biometric information provided by an individual. Such digital identification credentials can also be verified at the time of use through a verification system and method.

Specifically, the present invention is directed to a system and method for verifying and authenticating an individual's identity, allowing an entity to issue a digital identification credential to an individual, and a system and method for authenticating digital identification credentials presented by individuals to relying parties who wish to verify the identities of individuals. Also described herein is a system for obtaining accurate personal identifying information through the use of authenticated digital identification credentials.

These embodiments, and others described in greater detail herein, provide an entity with the improved ability to supply individuals with more secure, accurate, and authenticated identification credentials. Other features and advantages of the present invention will become apparent to those skilled in the art from the following detailed description and specific examples. While indicating preferred embodiments of the present invention, they are given by way of illustration and not limitation. Many changes and modifications within the scope of the present invention may be made without departing from the spirit thereof, and the invention includes all such modifications.

DETAILED DESCRIPTION

As described with reference to the accompanying figures, the present invention provides a digital identification credential and a method and system allowing an entity to issue a digital identification credential to an individual. Such an entity is referred to herein as a digital credential issuing entity. The present invention allows a digital credential issuing entity to issue a digital identification credential that is authentic, trustworthy, and accurate, and that has been verified in accordance with industry compliance standards and best practices. The digital identification credential and the method and system of the invention increase the likelihood that relying parties will be able to accurately identify individuals while protecting individuals' privacy and reducing instances of identity theft.

As used in this application, the terms "device," "computer," "service," "system," "interface," "server," or the like are generally intended to refer to a computer-related entity, either hardware, a combination of hardware and software, software, or software in execution or an entity related to an operational machine with one or more specific functionalities. For example, a service may be, but is not limited to being, a process running on a processor, a processor, an object, an executable, a thread of execution, computer-executable instruction(s), a program, and/or a computer.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. Of course, those skilled in the art will recognize many modifications can be made to this configuration without departing from the scope or spirit of the various embodiments.

The present invention may be implemented in compliance with digital identity guidelines issued by governmental entities, such as the National Institute of Standards and Technology's SP-800-63 Digital Identity Guidelines document suite, which is hereby incorporated by reference, and any additional and successor digital identity guidelines.

Figure 1:
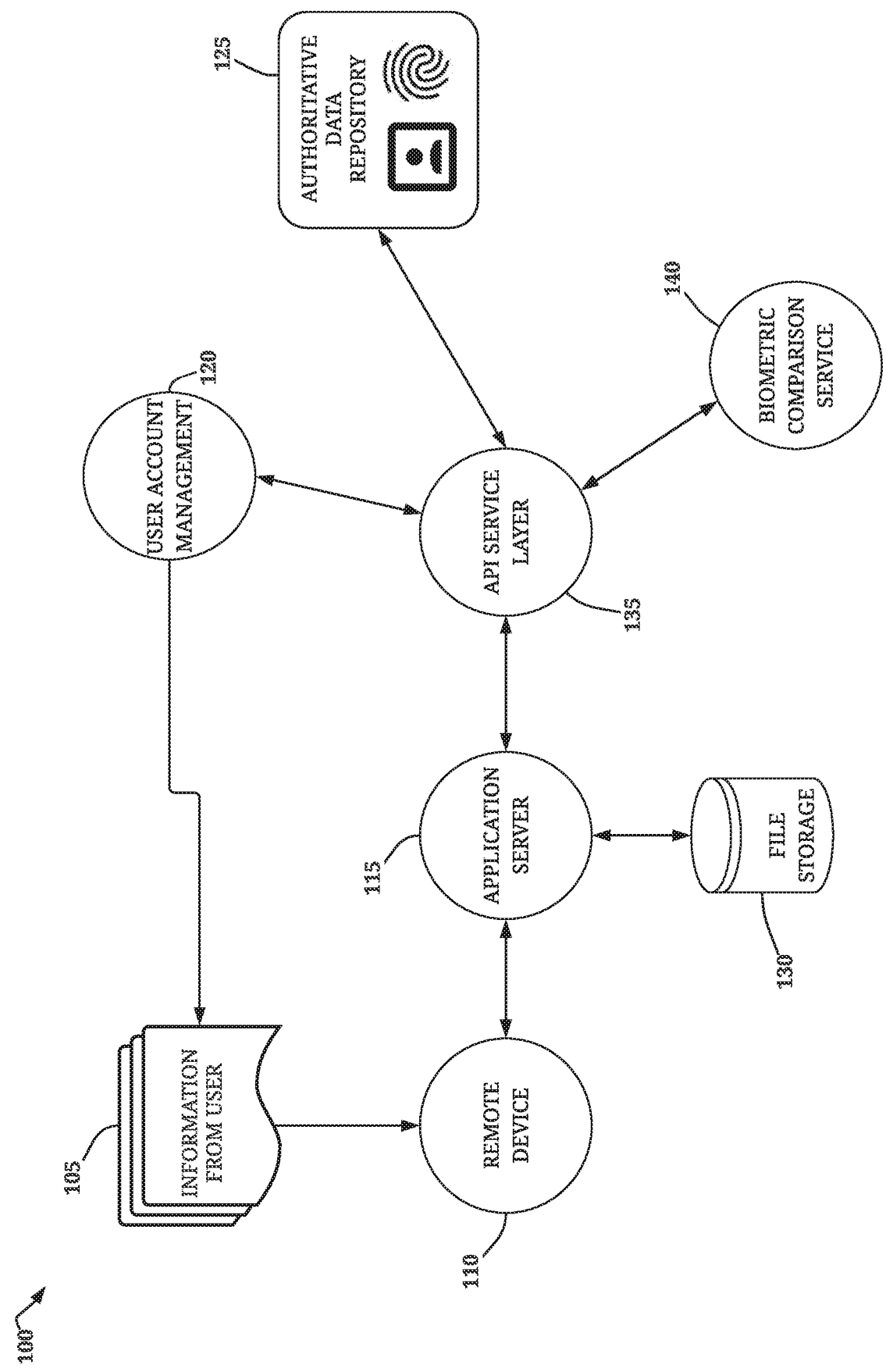
FIG. 1 is a block diagram illustrating an example of a computer environment in accordance with the subject specification

Referring first to FIG. 1, In a preferred embodiment, the present invention is implemented on a computer system comprising one or more servers or similar computing devices, and a remote device 110 on which an individual's digital identification credential is stored. The remote device 110 is a device comprising a processor and memory that stores executable instructions that, when executed by the processor, facilitate performance of operations. The remote device 110 could be a phone, tablet, computer, or other device, comprising software, which could be a software application, app, website, or other interface. The application server 115 is a server device comprising a processor and memory that stores executable instructions that, when executed by the processor, facilitate performance of operations.

The remote device 110 communicates either directly or indirectly with an application server 115 to receive and transmit information related to the remote device 110 and/or its environment, and information provided by the individual using the remote device 110. An application server 115 communicates either directly or indirectly with a remote device 110 and a plurality of servers and other computing devices through a variety of methods including the use of application programming interfaces, which may be organized as a plurality of application programming interfaces referred to herein as an "API service layer" 135.

It is envisioned that the system of the present invention can be implemented on any existing or future devices with the processing capability to perform the functions described herein. The scope of the present invention is not limited by the types of devices used. One skilled in the art will recognize that connections to external or internal network systems are merely exemplary, and alternative embodiments may have other connections.

The remote device 110 prompts an individual to provide permission for the remote device 110 to collect various forms of data, including personal identifying information and biometric identifying information. The individual responds by tapping the screen 105 or using any other input method provided by the remote device 110. The remote device 110 prompts the individual to provide, and then collects from the individual, in step 205, one or more pieces of personal identifying information 105 using an input method available through the use of the remote device 110, such as a camera, keyboard, or voice interaction. The personal identifying information 105 may comprise one or more pieces of information known by the individual or contained on one or more identification credentials possessed by the individual, such as a visual or alphanumeric code, identification number, name, or other information. Personal identifying information 105 from the individual may comprise the name, address, email address, telephone number, a plurality of digits from the individual's social security number, or other information provided by the individual.

The remote device 110 transmits, in step 210, the personal identifying information 105 to the application server 115. The application server 115 may cache the personal identifying information in file storage 130 for processing. The application server 115 transmits one or more pieces of personal identifying information or biometric identifying information collected from the individual to an authoritative data repository 125.

Figure 2:
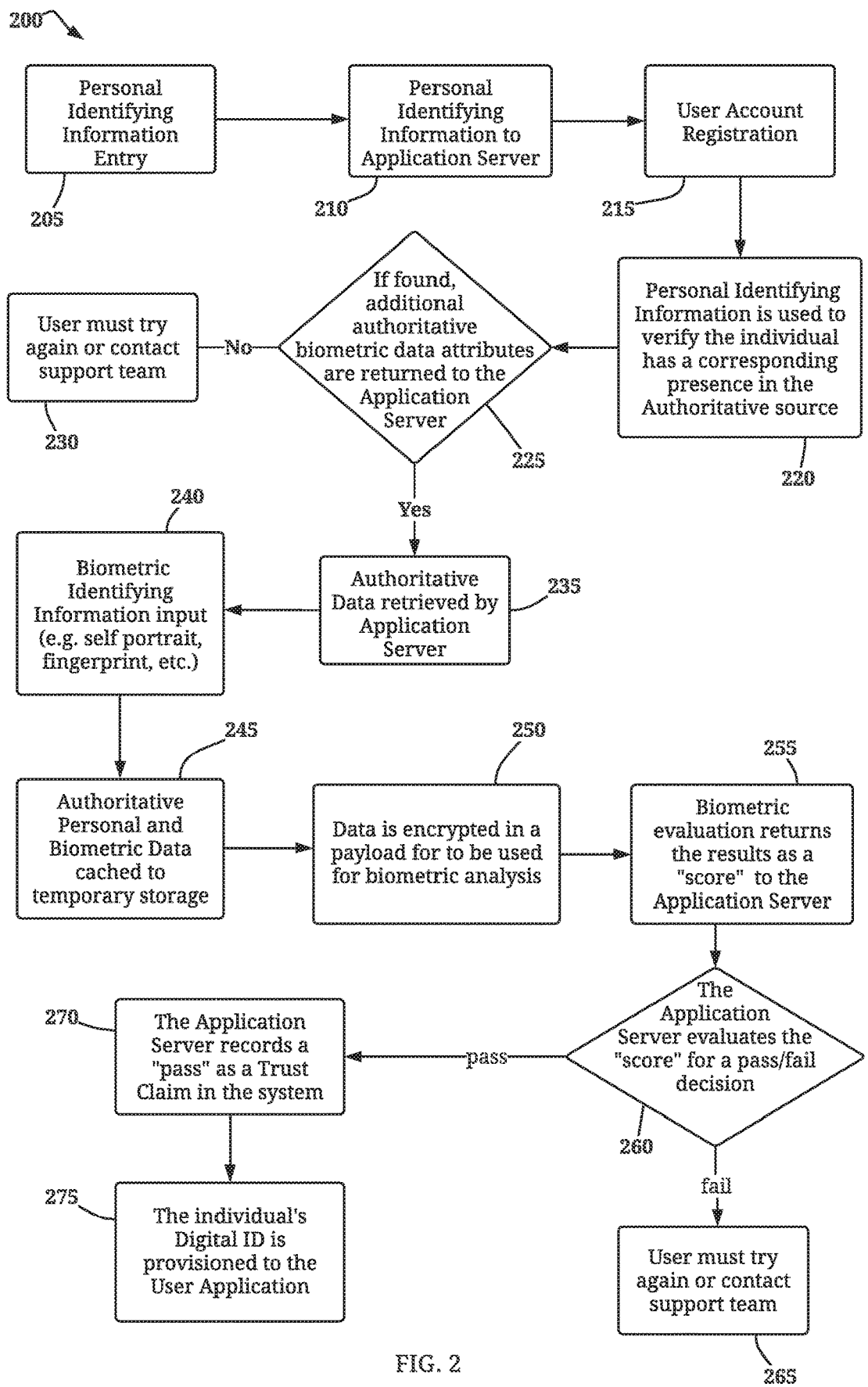
FIG. 2 is a flowchart illustrating an example of an authentication process in accordance with the subject specification

Referring to FIG. 2, the authoritative data repository 125 compares, in step 220, the personal identifying information or biometric identifying information received from the application server 115 to data records in the authoritative data repository 125. If, in step 225, the authoritative data repository 125 identifies a match between the data received from the application server 115 and a data record contained in the authoritative data repository 125, the authoritative data repository 125 transmits, in step 235, to the application server 115 a response indicating that a match was found and the authoritative data repository may also transmit, in step 225, to the application server 115 authoritative identifying information from the matching data record, which may comprise authoritative personal information such as a driver's license number and physical characteristics, or authoritative biometric information such as an authoritative photograph, fingerprint, or retinal scan. If the authoritative data source does not find a match, in step 230, the individual is prompted to try again or contact customer support.

The application server 115 causes an account to be created, in step 215, in user account management 120 for an individual who does not already have an account, or accesses an account in user account management 120 already associated with that individual. As a part of the account creation process user account management 120 may send a one-time verification code to the individual, which may be sent to the remote device 110 or another device or account, that the individual must input 105 into remote device 110 to confirm that the individual has access to a mobile phone number, email address, or other device or account that was provided by the individual to the remote device 110 as part of the account creation process or that is otherwise specified in the user account.

The remote device 110 requests that the individual use one or more input devices available through the use of the remote device 110, such as a camera or fingerprint reader, in a manner that allows the remote device 110 to create a self-portrait of the individual or obtain other biometric identifying information of the individual, such as a fingerprint or a retinal scan. In step 240, the remote device 110 collects and transmits biometric identifying information collected from the individual to the application server 115. The application server 115 may cache, in step 245, the information in temporary storage. The remote device 110 may also transmit to the application server 115 information related to the remote device 110, which may comprise the brand, model, device identifier, operating system, and other information about the remote device 110. The remote device 110 may also transmit to the application server 115 information related to the environment of the remote device 110, which may comprise the time, date, IP address, physical location, and other information about the environment in which the remote device 110 is being used.

The application server 115 transmits, in step 250, the authoritative biometric information and the biometric identifying data to a biometric comparison service 140. The biometric comparison service 140 may be connected either directly or indirectly to the application server 115 and may be a service on a different server or computing device. The biometric comparison service 140 analyzes and compares the biometric identifying data and the authoritative biometric information to determine whether the two data elements were obtained from the same individual, and calculates a match score from that analysis. One skilled in the art understands that the criteria for determining whether the match score is sufficiently high to authorize the issuance of a digital identification credential can be customized by the digital credential issuing entity. The biometric comparison service 140 transmits, in step 255, the match score to the application server 115.

The application server analyzes, in step 260, the match score. If the results of applying the criteria to the match score indicates that the authoritative biometric information and the biometric identifying information identify the same individual, in step 265, the application server transmits a message to the remote device indicating that the individual must try again or contact customer support. If the results of applying the criteria to the match score indicates that the authoritative biometric information and the biometric identifying information identify the same individual, in step 270, the application server 115 transmits authoritative identifying information and a message indicating that a valid authenticated digital identification credential has been issued to the remote device 110 and provisions, in step 275, a digital identification credential to the remote device 110 (e.g., a user application programmed therein). The remote device 110 stores authoritative identifying information in a secure location on the remote device 110. The individual can then access the authoritative identifying information on the remote device 110. The individual accesses that information by supplying login credentials to the remote device 110 using an input method provided by the remote device 110. If the remote device 110 determines that the login credentials entered by the individual match the login credentials stored in the remote device 110, the remote device 110 allows the individual to access the individual's authoritative identifying information, one manifestation of which may be a verified and authenticated digital identification credential.

An individual in possession of a digital identification credential created using the method of this invention can then show a visual representation of the digital identification credential to a relying party that wants to authenticate the identity of the individual. Alternatively, an individual in possession of a digital identification credential can choose to share authoritative identifying information about the individual using the authentication and verification system shown in FIG. 3.

Figure 3:
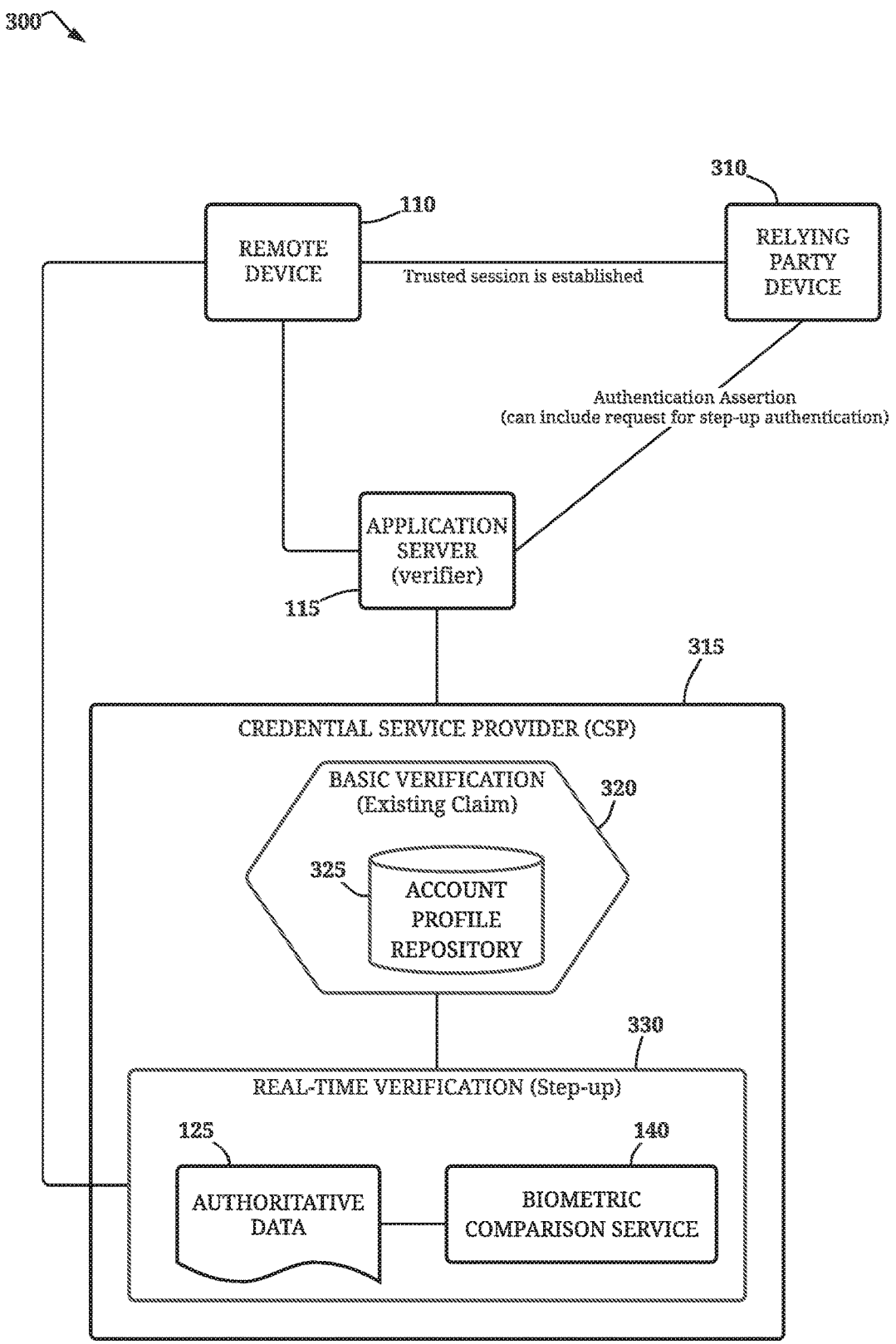
FIG. 3 is a block diagram illustrating an example of a computer environment in accordance with the subject specification

Referring now to FIG. 3, a relying party can authenticate an individual's identity and receive authoritative personal information about that individual by communicating either directly or indirectly with the application server 115. In the preferred implementation, the relying party communicates with the application server 115 through a relying party device 310. The relying party device 310 is a device comprising a processor and memory that stores executable instructions that, when executed by the processor, facilitate performance of operations. The relying party device 310 could be a phone, tablet, computer, server, or other device, comprising software, which could be a software application, app, website, or other interface. Either the remote device 110 or the relying party device 310 may be used to initiate an identity authentication request.

An individual can initiate an identity authentication request from the remote device 110. The individual logs into the account on the remote device 110. The individual identifies the relying party with which it wishes to share authoritative personal information by entering information into the remote device 110 such as a visual or alphanumeric code, or other identifier. The individual identifies the specific information that the individual consents to share with the relying party by tapping the screen or using any other input method provided by the remote device 110. The individual authorizes the request by tapping the screen or using any other input method provided by the remote device 110. The authorized request is transmitted from the remote device 110 to the application server 115, and the application server 115 transmits the authorized request to the relying party device 310. After receiving the authorized request from the application server 115, the relying party device 310 can respond in several different ways, such as denying the request, accepting the request and receiving authoritative personal information about the individual, or request that additional real-time verification of the individual be performed. If the relying party device 310 declines the request, the process concludes. If the relying party device 310 accepts the request, the application server 115 transmits to the relying party device 310 the specific authoritative personal information authorized by the individual for sharing with the relying party. If the relying party device 310 requests that additional real-time verification of the individual be performed, the application server 115 may utilize identity verification services using a real-time verification process 330 to initiate a real-time verification process. Following successful completion of the real-time verification process, the application server 115 transmits an authentication result to the relying party device 310.

A relying party can initiate an identity authentication request from the relying party device 310. The relying party inputs into a relying party device 310 one or more pieces of personal identifying information from an individual using an input method available through the use of the remote device 110, such as a camera, keyboard, or voice interaction. The relying party device 310 transmits a request to the application server 115 comprising the personal identifying information from the individual, a request for authentication of the individual's identity, optionally a request for certain authoritative personal information about the individual, and optionally a request for real-time verification of the individual. The application server 115 receives the request and may utilize services within the credential service provider environment 315 to attest or deny the authentication request. The application server 115 performs a search, in verification step 320, to determine whether the personal identifying information received from the relying party device 310 matches authoritative personal information stored directly or indirectly by the application server 115 such as in the account profile repository 325. If the application server 115 identifies a match, the application server 115 transmits a request to the remote device 110 of the individual whose data was matched, requesting that the individual authorize the application server 115 to share specific authoritative personal information with the relying party. The individual authorizes the request by tapping the screen or using any other input method provided by the remote device 110. The individual identifies the specific information that the individual consents to share with the relying party by tapping the screen or using any other input method provided by the remote device 110. The authorized request is transmitted from the remote device 110 to the application server 115, and the application server 115 communicates the authorization to the relying party device 310. If the relying party device 310 does not request real-time verification of the individual, the application server 115 transmits to the relying party device 310 the specific authoritative personal information authorized by the individual for sharing with the relying party. If the relying party device 310 requests that additional real-time verification of the individual be performed, the application server 115 may utilize identity verification services (e.g., real-time verification process 330) to initiate a real-time verification process. Following successful completion of the additional real-time verification, the application server 115 transmits an authentication result to the relying party device 310.

For the real-time verification process 330, the application server 115 transmits one or more pieces of personal identifying information or biometric identifying information from the individual's account profile repository 325 to the authoritative data repository 125. The authoritative data repository 125 compares 220 the personal identifying information or biometric identifying information received from the application server 115 to data records in the authoritative data repository 125. If the authoritative data repository 125 identifies a match 225 between the data received from the application server 115 and a data record in the authoritative data repository 125, the authoritative data repository 125 transmits, in step 235, to the application server 115 a response indicating that a match was found, and may also transmit, in step 225, to the application server 115 authoritative identifying information from the matching data record, which may comprise authoritative biometric information such as an authoritative photograph, fingerprint, or retinal scan. If the authoritative data source does not find a match, the process fails and the relying party is notified (e.g., step 230, FIG. 2). If the authoritative data source found a match, the remote device 110 requests that the individual use one or more input devices available through the use of the remote device 110, such as a camera or fingerprint reader, in a manner that allows the remote device 110 to create a self-portrait of the individual or obtain other biometric identifying information of the individual, such as a fingerprint or a retinal scan. The remote device 110 collects (e.g., step 240, FIG. 2) and transmits biometric identifying information collected from the individual to the application server 115. The application server 115 may cache (e.g., step 245, FIG. 2) the information in temporary storage. The remote device 110 may also transmit to the application server 115 information related to the remote device 110, which may comprise the brand, model, device identifier, operating system, and other information about the remote device 110. The remote device 110 may also transmit to the application server 115 information related to the environment of the remote device 110, which may comprise the time, date, IP address, physical location, and other information about the environment in which the remote device 110 is being used. The application server 115 transmits (e.g., step 250, FIG. 2) the authoritative biometric information and the biometric identifying data to a biometric comparison service 140. The biometric comparison service 140 may be connected either directly or indirectly to the application server 115 and may be a service on a different server or computing device. The biometric comparison service 140 analyzes and compares the biometric identifying data and the authoritative biometric information to determine whether the two data elements were obtained from the same individual, and calculates a match score from that analysis. One skilled in the art understands that the criteria for determining whether the match score is sufficiently high to authorize the issuance of a digital identification credential can be customized by the digital credential issuing entity. The biometric comparison service 140 transmits (e.g., step 255, FIG. 2) the match score to the application server 115. The application server analyzes (e.g., step 260, FIG. 2) the match score. If the results of applying the criteria to the match score indicates that the authoritative biometric information and the biometric identifying information identify the same individual (e.g., step 265, FIG. 2) the application server transmits a message to the remote device indicating that the individual must try again or contact customer support. If the results of applying the criteria to the match score indicates that the authoritative biometric information and the biometric identifying information identify the same individual (e.g., step 270, FIG. 2), the application server 115 transmits authoritative identifying information and a message indicating that a valid authenticated digital identification credential has been issued to the remote device 110 and provisions (e.g., step 275, FIG. 2) a digital identification credential to the remote device 110.

We claim:

1. A digital identity verification system, comprising:
   a user electronic device;
   a relying party (RP) electronic device;
   a credential service provider (CSP) separate from the RP electronic device and comprising:
   (a) a real-time verification subsystem in communication with the user electronic device, including
     (i) an authoritative data repository maintained by or on behalf of a governmental entity, and configured to store authoritative identifying information regarding one or more individual persons, including a user of the user electronic device, wherein the authoritative identifying information includes prior-collected authoritative personal information (API) and prior-collected authoritative biometric information (ABI) regarding the user, and
     (ii) a biometric comparison sub-system in communication with the authoritative data repository and configured to perform a real-time verification of an identity of the user using the prior-collected ABI; and
   (b) an account profile repository configured to store the prior-collected API in a user account established for the user of the user electronic device; and
   a verification server separate from the CSP and in operable communication with the user electronic device, the RP electronic device, the real-time verification subsystem, and the authoritative data repository, the verification server configured to:
   (a) receive, from at least one of the user electronic device and the RP electronic device, an identity verification request including personal identifying information (PII) related to the user;
   (b) search the account file repository for matching prior-collected API associated with the PII;
   (c) send, to the authoritative data repository, a real-time verification request including at least one API piece of the matching prior-collected API;
   (d) receive, from the biometric comparison sub-system, a comparative match score based on a comparison of the prior-collected ABI associated with the at least one API piece within the authoritative data repository; and
   (e) transmit, to the RP electronic device, a real-time identity verification result based on the received comparative match score,
   wherein the real-time verification subsystem is further configured to calculate the comparative match score based on an analysis of the prior-collected ABI with real-time biometric identifying information collected from the user electronic device after the real-time verification request is received by the authoritative data repository,
   wherein the account profile repository is separate from the authoritative data repository in a bifurcated database of the CSP,
   wherein the authoritative data repository of the bifurcated database is not searchable by the verification server,
   wherein the prior-collected API includes a first portion of the PII contained on a tangible identification credential issued to the user by the governmental entity,
   wherein the prior-collected API further includes an update to the first portion of the PII stored in the authoritative data repository subsequent to issuance of the tangible identification credential,
   wherein the update to the first portion of the PII (a) includes different information than the first portion of the PII, and (b) is not contained on the issued tangible identification credential, and
   wherein the comparative match score is further based, at least in part, on both of the first portion of the PII and the update to the first portion of the PII.

2. The system of claim 1, wherein the tangible identification credential is one of a passport and a driver's license.

3. The system of claim 1, wherein the tangible identification does not include the prior-collected ABI.

4. The system of claim 1, wherein the identity verification request is received from the user electronic device, and wherein the verification server is further configured to notify the RP electronic device of the identity verification request prior to sending the real-time verification request.

5. The system of claim 1, wherein the identity verification request is received from the RP electronic device, and wherein the verification server is further configured to notify the user electronic device of the identity verification request prior to sending the real-time verification request.

6. The system of claim 1, wherein the verification server is further configured to receive, from the user electronic device, a consent notification for the verification server to send a stores different information than that contained in the issued tangible identification credential and shown on the corresponding to the tangible identification credential to the RP electronic device prior to sending the real-time verification request.

7. The system of claim 1, wherein the real-time verification request from the verification server is triggered by the RP electronic device.

8. The system of claim 1, wherein the biometric comparison sub-system is further configured to receive the real-time biometric identifying information from the user electronic device by way of the verification server.

9. The system of claim 1, wherein the real-time identity verification result is further based on an environment of the user electronic device at a time when the real-time biometric identifying information was collected.

10. The system of claim 1, wherein the authoritative data repository of the CSP is further configured for compliance with digital identity guidelines contained in the National Institute of Standards and Technology (NIST) SP-800-63 Digital Identity Guidelines document suite.

11. The system of claim 1, wherein the real-time identity verification result includes a message indicating that a valid authenticated digital identification credential will not be issued.

12. The system of claim 1, wherein the real-time identity verification result includes a message indicating that a valid authenticated digital identification credential has been issued, and wherein the verification server is further configured to authorize a trusted session between the user electronic device and the RP electronic device based on the issued valid authenticated digital identification credential.

13. The system of claim 2, wherein the first portion of the PII contained on the issued tangible identification credential includes a first locational address associated with the user, and wherein the update to the first portion of the PII includes a second locational address associated with user and different from the first locational address.

14. The system of claim 3, wherein the prior-collected ABI includes at least one of a fingerprint of the user and a retinal scan of the user.

15. The system of claim 6, wherein the user electronic device is further configured to generate the digital identification credential including the first portion of the PII from prior-collected API, wherein the generated digital identification credential does not include the update to the first portion of the PII.

16. The system of claim 8, wherein the real-time biometric identifying information includes at least one of a fingerprint of the user and a retinal scan of the user.

17. The system of claim 8, wherein the authoritative data repository is further configured to collect the stored authoritative identifying information from the user electronic device without intervention of the verification server.

18. The system of claim 8, wherein the authoritative data repository is further configured to collect the stored authoritative identifying information from the governmental entity without intervention of the verification server.

19. The system of claim 9, wherein the environment of the user electronic device includes at least one of a timestamp, a date, an IP address of the user electronic device, a geo-location of the user electronic device, and a device ID.

* * * * *